United States Patent Office 3,131,546
Patented May 5, 1964

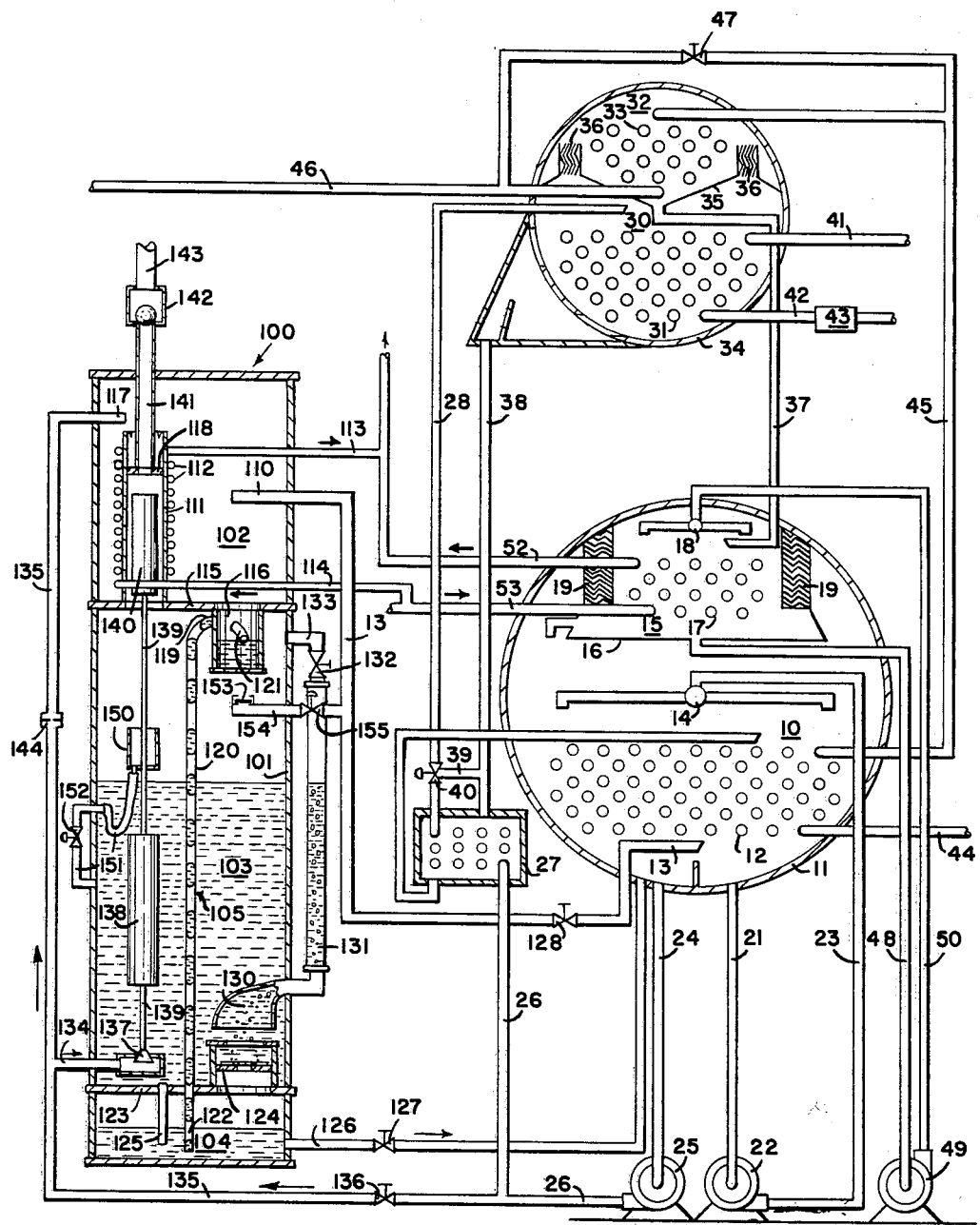

3,131,546
PURGE ARRANGEMENTS
William T. Osborne, Syracuse, N.Y., assignor to Carrier Corporation, Syracuse, N.Y., a corporation of Delaware
Filed Mar. 28, 1962, Ser. No. 183,123
14 Claims. (Cl. 62—85)

This invention relates to the purging of refrigeration systems of undesirable gases. More particularly, this invention relates to a purge arrangement and method of purging which is adapted for removing relatively noncondensible gases from an absorption refrigeration machine.

In order to achieve maximum economy and efficiency in operating various refrigeration systems, it is important to remove relatively noncondensible gases from certain parts of the systems where they have a marked adverse effect on their performance. For example, the refrigeration capacity of an absorption refrigeration machine can be seriously impaired by the presence of only a relatively small quantity of noncondensible gases in its absorber section. Noncondensible gases in an absorber section tend to provide a barrier which decreases the rate of absorption of refrigerant in the absorber. This decrease in the rate of refrigeration absorption startlingly reduces the capacity of the absorption machine to provide refrigeration, thus requiring a larger capacity machine to do a given cooling job.

Further, the noncondensible gases, particularly hydrogen, tend to insulate the absorber tubes and prevent necessary heat transfer from taking place between the cooling water flowing in the absorber tubes and the absorbent solution. This causes the absorbent solution to rise to an undesirably high temperature and further reduces the capacity of the refrigeration machine.

The existence of noncondensible gases in an absorption refrigeration machine also results in another principal difficulty. Because of the relatively low pressure which may exist in the absorber section, quantities of air, containing oxygen, may tend to leak through joints and seams from the atmosphere into the absorber section. Oxygen may cause corrosion of interior metal surfaces of the machine, and this corrosion is greatly accelerated by the presence of absorbent solutions commonly used in the machine. After a period of time, if the oxygen is not promptly removed from the system, the corrosion may become so severe as to cause complete failure of the machine, necessitating the replacement of expensive parts before operation can be resumed.

There are two principal causes for the presence of noncondensible gases in an absorption refrigeration machine. The first cause is air leakage into the machine due to the fact that the absorber section thereof may operate at a very low pressure, as little as $\frac{1}{100}$ of an atmosphere, compared to atmospheric pressure surrounding the machine. Consequently, air may leak into the machine through joints and seams and at other locations where portions of the machine are exposed to the atmosphere. The second principal cause for the existence of noncondensible gases is that certain corrosion reactions, such as galvanic corrosion, which may take place within the machine, even in the absence of oxygen, tend to produce hydrogen gas, which, as previously explained, may seriously impair absorber performance. Consequently, it is desirable, and an object of this invention, to provide a method and a means to purge the interior of a refrigeration machine of as many relatively noncondensible gases as possible in order to achieve full capacity and service life from the refrigeration system. Some conventional purge units have failed to operate satisfactorily. Others have failed to give an adequate indication of the rate of removal of noncondensible gases from the refrigeration systems with which they are associated. If the operator is able to observe the rate of removal of noncondensible gases from his machine, he is frequently able to detect an air leak or other potential malfunction of the machine long before a serious problem arises. Accordingly, it is an additional object of this invention to provide a purge unit which is capable of giving a visual indication of the rate of removal of noncondensible gases from a refrigeration system.

These and other objects of this invention are achieved in the illustrated preferred embodiment thereof by providing a separation chamber which may be an integral or separate portion of a refrigeration system. The separation chamber is divided into an auxiliary absorber chamber, a displacement chamber, and a collection chamber. In addition, means are provided to transfer relatively noncondensible gases from the auxiliary absorber chamber to the collection chamber, from which they pass into the displacement chamber while displacing liquid therefrom. A sight glass is provided with means to receive the relatively noncondensible gases in order to permit observation of the rate of removal of noncondensible gases from the refrigeration system. A passage is also provided for introducing a liquid under pressure into the displacement chamber for the purpose of expelling the noncondensible gases therefrom through a suitable check valve which is provided adjacent the upper region thereof.

An additional purge means is provided for initially pulling down the refrigeration system from atmospheric pressure, or for otherwise purging the system, if desired. This additional purge means, which may be utilized either separately or in combination with the purge arrangement previously described, comprises a passage to directly pass noncondensible gases from the refrigeration system into the displacement chamber. The displacement chamber is alternately flooded with liquid, which in the case of an absorption refrigeration machine may suitably be absorbent solution, and drained of the liquid in order to induce flow of the noncondensible gases into the displacement chamber. Suitable means are provided to prevent the return of the noncondensible gases through the purge passage during the flooding portion of the cycle so that they are expelled to the atmosphere or other desired location. The alternate flooding and displacing of liquid in the displacement chamber may be controlled by a suitable float arrangement, which can also be utilized to control the previously described purge arrangement.

These and other objects of this invention will become apparent by reference to the following specification and attached drawing wherein, the figure is a diagrammatic view, partially in cross-section, of an absorption refrigeration machine having a purge arrangement in accordance with one embodiment of this invention.

Referring particularly to the drawing, there is shown an absorption refrigeration machine comprising an absorber section 10 within a shell 11. A plurality of heat exchange tubes 12 are provided within the absorber section. A purge line 13 leads from a suitable region of the absorber and serves to conduct noncondensible gases therefrom to a suitable purge unit 100. A spray header 14 is located above the absorber section.

Also disposed in shell 11 is an evaporator section 15 comprising a pan-like member 16 within which may be disposed a plurality of heat exchange tubes 17. A spray header 18 may be located above heat exchange tubes 17 for distributing refrigerant thereover. A plurality of eliminators 19 are provided to prevent entrained liquid refrigerant particles being carried from evaporator section 15 to absorber section 10. Evaporator section 15 is in communiation with absorber section 10 through eliminators 19.

In operation, the system is evacuated to a low pressure by being purged of relatively noncondensible gases and a suitable refrigerant is sprayed over tubes 17 in evaporator section 15 while a suitable absorbent solution is sprayed over tubes 12 in absorber section 10. Refrigerant is vaporized in evaporator section 15 and passes through the eliminators into absorber section 10 where the refrigerant vapor is absorbed by the absorbent solution. The heat required to vaporize the refrigerant in evaporator section 15 is provided by the fluid passing through heat exchange tubes 17 which is thereby cooled, and this heat is carried with the vapor into absorber section 10 where it is given up to a cooling fluid passing through heat exchange tubes 12. Thus, the evaporation of refrigerant in evaporator section 15 produces a cooling or refrigeration effect on the fluid passing through heat exchange tubes 17.

Line 21 is connected to solution recirculation pump 22 and serves to circulate absorbent solution of intermediate strength accumulated in one section of the lower portion of absorber section 10 through line 23 to spray header 14 in order to recirculate absorbent solution in the absorber. A line 24 leads from another section of the lower portion of absorber section 10 containing weak solution, and solution pump 25 serves to pass the weak solution through line 26 and solution heat exchanger 27 through line 28 to generator section 30.

As used herein, the term "strong solution" refers to an absorbent solution strong in absorbing power and the term "weak solution" refers to absorbent solution weak in absorbing power. The term "intermediate strength solution" refers to a solution having a concentration intermediate that of strong solution and weak solution.

A suitable absorbent for a refrigeration system of the type described, comprises a hygroscopic aqueous salt solution such as lithium bromide and water and a suitable refrigerant is water. The concentration of the strong solution leaving the generator may be about 65%.

The absorption of refrigerant vapor by absorbent solution in absorber section 10 dilutes the absorbent solution, reducing its absorptive power, and diminishes the refrigerant supply, which must be replenished in order to maintain the refrigeration machine in operation. It is desirable, therefore, to concentrate the weak solution, by separating it from the absorbed refrigerant, and to return the refrigerant to the evaporator section and the concentrated absorbent solution to the absorber section. For this purpose, a generator section 30 and a condenser section 32 are provided.

Generator section 30 is located in shell 34 and comprises a plurality of heat exchange tubes 31 for placing steam or other heating fluid in heat exchange relation with solution in the generator. Also located within shell 34 is condenser section 32 comprising a pan-like member 35 within which is disposed a plurality of heat exchange tubes 33 for passing cooling water. Eliminators 36 are provided to prevent strong solution from being entrained in refrigerant vapor passed from generator section 30 to condenser section 32.

A line 37 leads from pan-like member 35 to evaporator section 15 and serves to return condensed refrigerant from the condenser section to the evaporator section. Line 38 extends from generator section 30 through solution heat exchanger 27 to absorber section 10 and serves to return relatively hot, strong absorbent solution from the generator section to the portion of the absorber section containing intermediate strength solution while passing it in heat exchange relation with relatively cool, weak solution being forwarded to the generator for concentration thereof.

A bypass line and bypass valve 40 having a suitable actuator mechanism may be provided for capacity control of the refrigeration system. Reference is made to Leonard application Serial No. 2203, filed January 13, 1960, now Patent Number 3,054,272 for a more complete description of the control arrangement.

A steam inlet line 41 and a steam outlet line 42 having a suitable steam trap 43 may be provided to admit steam to heat exchange tubes 31 in order to boil off refrigerant vapor from weak solution supplied to the generator, thereby concentrating the weak solution. Other heating medium may be employed, if desired, to heat solution in generator 30.

The vaporized refrigerant passes through eliminators 36 and is condensed in condenser 32. For this purpose, a cooling water inlet line 44 is connected to heat exchange tubes 12 in absorber section 10 from which the cooling water passes through line 45 to heat exchange tubes 33 in the condenser section. The cooling water is then discharged through line 46. An appropriate bypass line and valve 47 may be provided to bypass cooling water around the condenser section, if desired.

A suitable recirculation line 48 and refrigerant recirculation pump 49 is provided to pass refrigerant from pan 16 of the evaporator section through line 50 to spray header 18 so that refrigerant may be sprayed over heat exchange tubes 17 to wet them and aid in evaporation of the refrigerant and cooling of heat exchange tubes 17. Lines 52 and 53 are provided to conduct a heat exchange fluid, such as water, through heat exchange tubes 17 to cool the fluid by the resulting heat exchange with the cooled refrigerant in evaporator 15. This cooled heat exchange fluid is then passed by a pump (not shown) to suitable remotely located heat exchanges to provide cooling in the desired regions.

In accordance with this invention, a purge arrangement 100, which is exaggerated in size for purposes of clarity and explanation, is provided to remove relatively noncondensible gases from absorber section 10. Purge arrangement 100, which it will be understood may be applied to other types of refrigeration systems as well as the one shown, comprises a separation chamber 101 having a vertically disposed shell which is divided into an upper region, or auxiliary absorber chamber, 102; an intermediate region, or displacement chamber, 103; a lower region, or collection chamber, 104; and a fall tube gas transfer means 105. It will be appreciated that, while separation chamber 101 is shown to comprise a separate shell, this chamber may, in practice, be formed as an integral portion or region of vessels comprising the refrigeration system with which it is to be used. It will be subsequently explained that by suitable designing of the purge arrangement, the collection chamber may comprise the lower portion or region of the displacement chamber and it is to be understood that the term "collection chamber" as used herein is intended to include such constructions.

Auxiliary absorber chamber 102 comprises a purge inlet passage 110 which is connected to purge line 13 terminating in absorber section 10 of the refrigeration system. Disposed within auxiliary absorber chamber 102 is a heat exchanger 111 which may comprise a hollow vertically extending cylinder. A heat exchange coil 112 having an outlet line 113 and an inlet line 114 is disposed about heat exchanger 111. Outlet line 113 may be connected to line 52, and inlet line 114 may be connected to line 53, which passes water or other heat exchange medium which is chilled in evaporator section 15 of the refrigeration machine. While this arrangement will cause relatively warm heat exchange medium to flow through heat exchange coil 112, due to the pressures existing in lines 52 and 53, in normal operation of the refrigeration system, the temperature of the heat exchange medium passing through heat exchanger 112 will be sufficiently lower than the temperature in absorber section 10 to provide the desired cooling effect.

A partition 115 forms a sump 116 and divides auxiliary absorber chamber 102 from displacement chamber 103. Sump 116 may desirably be a separate trough-like portion, as shown in the drawing, or may comprise merely the lower portion of auxiliary chamber 102 formed by a flat partition 115, if desired. An absorbent solution inlet 117 is provided to supply absorbent solution to heat exchanger 111, which may have a bottom plate 118, as shown in the drawing, to provide a reservoir of cold absorbent solution.

In operation, absorbent solution is introduced from inlet 117 at a relatively low rate into the cup formed by bottom plate 118, and the wall of heat exchanger 111. This absorbent solution then overflows notches in the top of heat exchanger 111 and passes downwardly over cooling coil 112 in order to reduce its temperature below that of the temperature of the absorbent solution in absorber section 12. The pressures existing in auxiliary absorber 102 and absorber section 10 are primarily dependent upon the vapor pressure of absorbent solution in these regions. Consequently, by cooling the absorbent solution in absorber 102 to a temperature lower than the temperature of absorbent solution in absorber section 10, the pressure in auxiliary absorber 102 may be maintained lower than the pressure in absorber section 10. The absorbent solution supplied to auxiliary absorber chamber 102 is preferably weak solution from absorber section 10 so that a relatively low pressure may be provided by cooling this weak solution in the auxiliary absorber without the danger of crystallizing the absorbent salt to any serious extent. Consequently, the pressure in auxiliary absorber chamber 102 is sufficiently lower than the pressure in absorber section 10 as to induce the flow of relatively noncondensible gases from absorber section 10 to auxiliary absorber 102. It will be appreciated that some relatively condensible gases, such as refrigerant vapor, are normally carried into the auxiliary absorber chamber 102 along with the relatively noncondensible gases.

The uncondensed gases passed to auxiliary absorber 102 comprise relatively noncondensible gases such as hydrogen, oxygen and nitrogen which do not normally exist as a liquid at the pressures in the refrigeration machine. These uncondensed gases also include some relatively condensible gases such as refrigerant vapor, which in the system described would be water vapor, which serve to sweep the noncondensible gases into the auxiliary absorber. One advantage of the arrangement described is that a substantial quantity of this refrigerant vapor is condensed into the relatively cool absorbent solution present in the auxiliary absorber section and recovered therein, thereby reducing the volume of gas which must be handled by the rest of the purge unit. The heat of condensation and dilution of this effect is also removed by heat exchanger 111.

In practice, the relatively noncondensible gases may be swept into the auxiliary absorber by the flow of the relatively condensible gases thereto. Consequently, the actual pressure difference between the auxiliary absorber and the absorber section may be very small because the absorption and condensation of relatively condensible gases therein maintain a continuous flow of gases to the auxiliary absorber.

A transfer device 105 is provided to transfer the uncondensed gases passed to auxiliary absorber 102 to collection chamber 104. Transfer device 105 comprises a fall tube 120 having a first open end 121 disposed adjacent sump 116 and open to auxiliary absorber chamber 102. Fall tube 120 has an arched portion 119 raised above open end 121 and a second open end 122 in communication with collection chamber 104, preferably below the level of liquid therein to form a liquid seal type valve to prevent return of gas up the fall tube.

It can be seen that fall tube 120 comprises a syphon. When the level of liquid in the auxiliary absorber, and, specifically, in sump 116 rises above the level of arched portion 119, liquid will be caused to flow downwardly through the vertical portion of fall tube 120 into collection chamber 104. Liquid will continue to be syphoned from sump 116 until open end 121 is uncovered and exposed to the gas in the auxiliary absorber. A quantity of gas will enter the open end of the fall tube and be drawn downwardly toward collection chamber 104 by the liquid falling downwardly in the vertical portion of the fall tube. After a very short period of time, the level of absorbent solution in sump 116 will rise above the open end 121 due to the passage of absorbent solution to the auxiliary absorber through inlet 117. At this time, another slug of liquid solution will be withdrawn from sump 116 and open end 121 again uncovered. Accordingly, the fall tube will pass alternate slugs of liquid and noncondensible gases downwardly into collection chamber 104.

Collection chamber 104 is formed by partition 123 which is spaced from partition 115. Liquid absorbent solution is discharged from open end 122 of fall tube 120 into the lower portion of collection chamber 104. The noncondensible gases collect in the upper portion of collection chamber 104 and are passed through a check valve 124. Check valve 124 permits the noncondensible gases to rise upwardly into displacement chamber 103 while at the same time it may permit displaced solution from chamber 103 to pass downwardly into collection chamber 104. Preferably, however, collection chamber 104 is provided with a solution passage 125 which comprises the means to pass liquid displaced from displacement chamber 103 into collection chamber 104. Consequently, valve 124 and passage 125 form a part of the gas transfer means from auxiliary absorber 102 to displacement chamber 103.

Collection chamber 104 is also provided with means to return solution transferred or displaced thereto to a suitable collection region. In the case of the refrigeration system described, where the liquid in collection chamber 104 comprises a system liquid, i.e. absorbent solution, this liquid may be transferred back to the refrigeration system. For this purpose, solution return line 126 leads from collection chamber 104 through a solution return valve 127 to absorber section 10 to transfer the absorbent solution from collection chamber 104 to the absorber section. Solution return valve 127 and purge line valve 128 may be omitted, if desired, but their inclusion in the system permits the purge unit to be isolated from the refrigeration system, if desired. It will be understood that, if the liquid collected in collection chamber 104 is not a system liquid, return line 126 might either lead to a liquid collection vessel or collection chamber 104 could be made large enough to accommodate the volume of solution which it would be required to handle by the purge arrangement.

Displacement chamber 103 is formed between partitions 115 and 123, and is adapted to contain a quantity of absorbent solution. As gas is passed from collection chamber 104 into the displacement chamber, the solution therein is displaced and passed into the collection chamber. It will, therefore, be observed that the displacement chamber is adapted to store the relatively noncondensible gases which are passed to the purge arrangement from the refrigeration system. If desired, collection chamber 104 may comprise the lower portion of displacement chamber 103. In that event, partition 123, valve 124, and line 125 may be omitted since the means to perform their functions would comprise the lower open end of the fall tube and the communication existing between the collection and displacement portions of the displacement chamber. Fall tube 103 would then be opened to the lower portion, or collection chamber, formed by the bottom of displacement chamber 103 and a suitable check or other type valve would be provided at the bottom of the fall tube to restrict the return of noncondensible gases and solution to the auxiliary absorber chamber during flooding of the displacement chamber. Line 126 would still be connected to the collection region or chamber formed by the lower portion of the displacement chamber of this modification.

As previously pointed out, it is desirable for the operator of a refrigeration system to have a ready indication of the rate of removal of noncondensible gases from the system in order to quickly detect the existence of an abnormal leakage condition before serious corrosion difficulties arise. For this purpose, a collection means comprising a hood 130 is provided adjacent the lower portion of displacement chamber 103 to collect the relatively noncondensible gases which are passed thereto. These noncondensible gases are passed from collection means 130 to a sight glass 131. Sight glass 131 has an upper end in communication with the upper portion of displacement chamber 103 through sight glass valve 132 and return fitting 133 adjacent the upper region thereof. Sight glass 131 has a substantially smaller cross-sectional area than that of displacement chamber 103 and extends axially therealong in a generally vertical direction.

When valve 132 is in an open position, the level of solution in displacement chamber 103 is readily observable by noting the level of solution in sight glass 131. When valve 132 is thereafter closed, noncondensible gases are passed from collection chamber 104 to displacement chamber 103 through sight glass 131, displacing liquid in the sight glass rather than in the rest of the displacement chamber. Consequently, after a relatively short period of operation the operator is able to accurately measure the volume of noncondensible gases which are removed from absorber section 10, known the cross-sectional area of sight glass 131, by measuring the drop in level of solution in the sight glass. By this means, an air leak in the refrigeration system may be detected at an early time before serious corrosion damage occurs. In addition, by opening valve 132, the noncondensible gases are passed from the sight glass into the upper portion of the displacement chamber and the solution level therein is readily observable. Consequently, the operator can determine whether the purge arrangement is functioning properly or whether the valve arrangement, which will be subsequently described, is improperly functioning.

After a predetermined volume of relatively noncondensible gases, including some relatively condensible gases such as water vapor, are collected and stored in displacement chamber 103, they are expelled from the displacement chamber by flooding it with liquid solution. For this purpose displacement chamber 103 is provided with a solution line 135 including a solution valve 136 which passes solution to solution inlet line 134 and solution inlet valve 137. Solution line 135 also passes solution to solution inlet 117 through a metering device 144, such as a valve or a restricted orifice. Metering device 144 is sized to provide a relatively low rate of flow of solution through inlet 117 to auxiliary absorber 102. Valve 124 and the liquid in chamber 103 restrict return of the noncondensible gases during the flooding of the displacement chamber.

Solution inlet valve 137 is controlled by a float arrangement comprising a lower float 138 and an upper float 140 adjacent the lower and upper regions respectively of displacement chamber 103. Floats 138 and 140 are connected by a shaft 139 which in turn is connected to actuate the opening and closing of valve 137. Displacement chamber 103 is also provided with an exhaust passage 141 including an exhaust check valve 142 and an exhaust line 143, which conducts the noncondensible gases to a desired location, such as a purge gas recovery unit, or to the atmosphere. When a predetermined low level of solution exists in displacement chamber 103 due to the accumulation of a corresponding predetermined volume of uncondensed or relatively noncondensible gases in the upper portion of the displacement chamber, lower float 138 no longer exerts sufficient buoyant force to maintain valve 137 open and the combined weight of floats 138 and 140 is sufficient to cause the valve to open. When valve 137 opens, solution is admitted to flood displacement chamber 103 under a pressure which is determined by the head developed by solution pump 25. An auxiliary booster pump may be provided in line 135 if the head developed by solution pump 25 is insufficient for the purpose. Exhaust valve 143 also may be designed to prevent loss of solution from the purge unit in the event of malfunction of solution valve 137, if desired.

As solution floods displacement chamber 103, the volume of noncondensible gases in the chamber is compressed and relatively condensible gases, such as refrigerant vapor, are condensed into the body of solution. Exhaust check valve 142 should be adjusted to open at a pressure slightly greater than that of the ambient pressure in exhaust line 143 so as to restrict the ingress of ambient fluid into the purge arrangement. When the pressure of the relatively noncondensible gases in displacement chamber 103 is compressed to a pressure exceeding that to which exhaust check valve 142 is set to open, the exhaust check valve opens and the relatively noncondensible gases are exhausted from the displacement chamber.

When the level of solution in displacement chamber 103 reaches upper float 140, the combined buoyancy of floats 140 and 138 are sufficient to close solution inlet valve 137, whereupon no further absorbent solution is admitted to the displacement chamber and the displacement chamber is then relatively full of solution. It will be appreciated that it is desirable to have the volume of noncondensible gases which remain in the displacement chamber at the time of closing of solution inlet valve 137 as small as possible. This is achieved by positioning upper float 140 in the interior hollow cylindrical portion of heat exchanger 111 since, as shown in the drawing, the cross-sectional area of this portion of the displacement chamber is relatively small and the volume of noncondensible gases retained therein is negligible.

The purge cycle starts over again when solution inlet valve 137 closes. Absorbent solution from the displacement chamber is then again displaced by noncondensible gases which are withdrawn from absorber section 10, passed to auxiliary absorber 102, transferred through transfer device 105, collected in collection chamber 104, and admitted through valve 124 to the displacement chamber. The pressure of solution in line 134 acting on the underside of solution valve 137 aids in maintaining the solution valve closed until the desired low solution level is reached in displacement chamber 103. A small bypass port or groove may be provided in solution valve 137, if desired, to assure dilution of the solution in displacement chamber 103 upon shutting down of the machine or other condition which might cause solidification of absorbent solution therein. Also, line 125 may comprise a groove or aperture in the valve plate of valve 124, if desired.

While a single fall tube transfer device 105 has been shown, it will be understood that a plurality of such fall tubes may be utilized to transfer a greater volume of noncondensible gases from auxiliary absorber 102 to collection chamber 104. However, in order to pull down a refrigeration system which is initially at atmospheric pressure, an additional purge arrangement may be conveniently incorporated as a part of purge arrangement 100.

The additional purge arrangement comprises a solution cup 150 secured to shaft 139 having a hollow interior portion which is open at its upper end and closed at its lower end. Adjacent the lower end of cup 150 there is provided a cup drain line 151 and a cup drain valve 152 for controlling drainage of the cup. A gas inlet check valve 153 connects a gas inlet line 154 having gas inlet valve 155 in series therewith to purge line 13 of the refrigeration system.

In order to initially purge the refrigeration system with the auxiliary purge arrangement, gas inlet valve 155 is opened, and it will be assumed that displacement chamber 103 is substantially filled with absorbent solution. Displacement chamber 103 is positioned vertically with respect to a solution level or pressure in absorber section 10 so that, when full, the level of solution in the displacement chamber is substantially above the level or pressure of solution in the absorber section. Consequently, the level of solution in displacement chamber 103 will tend to drop, or may be withdrawn by means of a suitable pump, and the solution will pass into absorber section 10 through solution passage 125 and return line 126, assuming valve 127 is open. As the solution level drops a sufficiently low vacuum is created in displacement chamber 103 so that the volume of solution is displaced by air or other uncondensed gases, withdrawn from absorber section 10 and induced by the vacuum to pass through purge line 13, gas inlet valve 155, gas inlet line 154, and gas inlet check valve 153. It should be appreciated that the actual vertical position of the displacement chamber with respect to absorber section 10 depends on the relative pressures between them, particularly when various pumps are employed in the system.

Cup drain valve 152 is closed and, consequently, when the level of solution in displacement chamber 103 drops below that of cup 150, solution is trapped in the cup adding to the weight tending to open solution inlet valve 137. Consequently, when the solution level in the displacement chamber drops a predetermined amount, the buoyancy of lower float 138 is insufficient to keep valve 137 closed due to the weight of upper float 140 and the full cup of solution 150. Solution inlet valve 137 then opens and floods displacement chamber 103 with absorbent solution and exhausts the noncondensible gases accumulated therein through exhaust passage 141. Gas inlet check valve 153 automatically restricts the return of these noncondensible gases to absorber section 10. It will be appreciated that, while a self-actuating check valve 153 has been shown in gas inlet line 154, this valve could be manually operative, if desired, and that, in actual practice, valve 155 could serve this function. In that event, it would be convenient to provide a float control mechanism to automatically close valve 155 when solution inlet valve 137 is in an open position. It will also be understood that when the previously described purge utilizing transfer device 105 is in operation, valve 155 is maintained closed. Cup 150 is provided to cause the opening of valve 137 at the proper solution level but may be omitted by proper positioning or arrangement of the float system.

After the relatively noncondensible gases are exhausted from displacement chamber 103 and the level of solution therein reaches upper float 140, solution inlet valve 137 closes and the auxiliary purge cycle starts over again. It will be seen that the auxiliary purge arrangement is well adapted to the initial purging of the absorption refrigeration system in order to start the system up from atmospheric pressure. Under these circumstances, the auxiliary purge can handle a greater volume of noncondensible gases than can be passed through the fall tube transfer device, which is utilized as an operating purge rather than an initial purge. After the absorption refrigeration machine has been pumped down to a sufficiently low pressure by the auxiliary purge, gas inlet valve 155 is closed, cup drain valve 152 is opened, and purge arrangement 100 operates in the manner previously described.

Accordingly, it is seen that this invention provides a simple and relatively inexpensive purge arrangement which is capable of being utilized either as an initial purge or as an operating purge, depending upon the need at a particular time. It will also be observed that the purge arrangement described can be easily made automatic in operation by automatically controlling the various valves in response to the solution level sensed by the floats in the displacement chamber. This assures a simple and dependable method and apparatus for purging a refrigeration system. It will also be understood that the check valves herein described can be made manual valves or automatically operating valves without departing from the scope of this invention and they are described as check valves merely to illustrate their function.

Various other modifications of this invention, within the scope of the following claims, will occur to those skilled in the art, and the foregoing embodiment is described only by way of an example of the preferred practice of this invention.

I claim:
1. A purge arrangement for removing relatively noncondensible gases from a refrigeration system, said purge arrangement comprising:
   (a) means defining an upper region comprising an auxiliary absorber chamber,
   (b) means defining an intermediate region comprising a displacement chamber,
   (c) gas transfer means for trnsferring relatively noncondensible gases from said auxiliary absorber chamber to said displacement chamber to displace a liquid therein while substantially preventing the return of said relatively non-condensible gases back to said auxiliary absorber chamber, and
   (d) means to supply a liquid under sufficient pressure to flood said displacement chamber and to expel said relatively non-condensible gases therefrom.

2. A purge arrangement as defined in claim 1 wherein said purge arrangement further comprises a collection chamber separated from said displacement chamber by partition means and wherein said gas transfer means includes passage means for transferring relatively noncondensible gases from said auxiliary absorber to said collection chamber and means for transferring relatively noncondensible gases from said collection chamber to said displacement chamber through said passage means.

3. A purge arrangement as defined in claim 1 wherein said gas transfer means includes a valve for restricting said return of relatively noncondensible gases.

4. A purge arrangement, adapted for removing relatively noncondensible gases from a region of an absorption refrigeration system, comprising:
   (a) shell means defining vertically extending vessel,
   (b) said vessel comprising:
      (1) an upper region comprising an auxiliary absorber chamber,
      (2) an intermediate region comprising a displacement chamber, and
      (3) a lower region comprising a collection chamber,
   (c) said auxiliary absorber comprising means for withdrawing and transferring relatively noncondensible gases from an absorption refrigeration system to said auxiliary absorber chamber and including:
      (1) purge passage means for conducting said relatively noncondensible gases from said absorption refrigeration system to said auxiliary absorber chamber,
      (2) means for providing absorbent solution in said auxiliary absorber chamber,
      (3) means for cooling the absorbent solution in said auxiliary absorber chamber to provide a sufficiently low pressure therein to induce the flow of realtively noncondensible gases from said absorption refrigeration system to said auxiliary absorber chamber through said purge passage means,
      (4) a sump for collecting absorbent solution passed to said auxiliary absorber,
   (d) gas transfer means for transferring relatively noncondensible gases from said auxliary absorber chamber to said collection chamber, said gas transfer means including a fall tube having
      (1) a first open end thereof extending from said sump in said auxiliary absorber,
      (2) a raised passage portion extending above said first open end, and
      (3) a second open end opening into said collection chamber for discharging relatively noncondensible gas and absorbent solution removed from said auxiliary absorber into said collection chamber, (e) said collection chamber being in communication with said displacement chamber so that said relatively noncondensible gases are enabled to pass from said collection chamber to said displacement chamber to displace absorbent solution therein, (f) exhaust means for discharging said relatively noncondensible gases from said displacement chamber and (g) means including a passage for periodically introducing absorbent solution into said displacement chamber under a pressure sufficient to compress relatively noncondensible gases therein to a pressure sufficient to expel them through said exhaust means.

5. A purge arrangement as defined in claim 4 wherein said exhaust means comprises an exhaust check valve for automatically discharging relatively noncondensible gases from said displacement chamber when they are compressed to a pressure sufficient to open said exhaust check valve by introduction of absorbent solution into said displacement chamber.

6. A purge arrangement as defined in claim 4 wherein said means for periodically introducing absorbent solution into said displacement chamber includes a solution inlet valve and means to automatically actuate said solution inlet valve in response to solution level in said displacement chamber.

7. A purge arrangement as defined in claim 4 wherein absorbent solution is automatically introduced periodically into said displacement chamber by means of a float valve arrangement which comprises:

(a) a float controlled solution inlet valve for introducing said absorbent solution into said displacement chamber, (b) a low level float associated with said solution inlet valve and disposed adjacent a relatively lower portion of said displacement chamber, said low level float having insufficient buoyancy in the absorbent solution to maintain said solution inlet valve in a closed position when the level of absorbent solution in said displacement chamber drops below a desired low level, thereby serving to automatically open said solution inlet valve when a substantially predetermined volume of absorbent solution has been displaced from said displacement chamber, and (c) a high level float associated with said solution inlet valve and disposed adjacent a relatively upper portion of said displacement chamber, said high level float having sufficient buoyancy in the absorbent solution to cause the solution inlet valve to automatically close upon sensing a desired maximum height of absorbent solution in said displacement chamber.

8. A purge arrangement as defined in claim 4 including means associated with said displacement chamber for giving an accelerated visual indication of the rate of removal of relatively noncondensible gases from said absorption refrigeration system, said last named means including:

(a) a vertically extending sight glass having an upper and a lower end, and having a cross-sectional area substantially less than the cross-sectional area of said displacement chamber, (b) said upper end of said sight glass being adapted for communication with an upper region of said displacement chamber, (c) said lower end of said sight glass being in communication with a lower region of said displacement chamber, (d) collection means to pass relatively noncondensible gases admitted to said displacement chamber to said sight glass, and (e) valve means adajcent the upper portion of said sight glass to trap said relatively noncondensible gases therein when said valve is in a closed position to provide a visual indication of the rate of displacement of liquid from said sight glass.

9. A purge arrangement as defined in claim 4 including additional purge means to exhaust relatively noncondensible gases from an absorption refrigeration system, said additional purge means including:

(a) gas inlet means to pass relatively noncondensible gases directly into said displacement chamber from said absorption refrigeration system, and (b) valve means associated with said gas inlet means for restricting return of said relatively noncondensible gases from said displacement chamber back to said absorption refrigeration system, so that said absorption refrigeration system may be purged by alternate flooding of said displacement chamber with absorbent solution to expel the relatively noncondensible gases therefrom, and subsequent draining of said displacement chamber to induce more relatively noncondensible gases to flow thereto from said absorption refrigeration system.

10. A purge arrangement as defined in claim 9 wherein said additional purge is automatically actuated by means including at least one float.

11. A purge arrangement as defined in claim 10 wherein said additional purge means includes:

(a) a cup member disposed on a shaft connected to said float, (b) cup drain line means for draining said cup member, (c) cup drain valve means to restrict drainage of said cup member so that said additional purge means is automatically actuated to purge said absorption refrigeration system due, at least in part, to the weight of liquid trapped in said cup when said cup drain valve is in a position to restrict drainage of said cup.

12. A purge arrangement for removing relatively noncondensible gases from a refrigeration system comprising:

(a) a displacement chamber, (b) exhaust passage means associated with said displacement chamber for expelling gases therefrom, (c) liquid passage means for supplying a liquid to flood said displacement chamber to expel gas through said exhaust passage means, (d) purge passage means for passing relatively noncondensible gases from said refrigeration system to said displacement chamber, (e) means to restrict the return of said relatively noncondensible gases from said displacement chamber to said refrigeration system through said purge passage means, (f) passage means to permit liquid to be displaced from said displacement chamber by said relatively noncondensible gases and to flow out of said displacement chamber, (g) said displacement chamber being vertically positioned with respect to said refrigeration system so that passage of liquid out of said displacement chamber through the passage means provided therefore induces flow of relatively noncondensible gases from said refrigeration system into said displacement chamber through said purge passage means, and so that subsequent flooding of said displacement chamber serves to compress the relatively noncondensible gases and expel them from said displacement chamber through said exhaust means.

13. A purge arrangement for removing gases from a region of a refrigeration system and transferring them to a desired location, said purge arrangement comprising:

(a) means defining a displacement chamber adapted to contain a liquid, (b) exhaust passage means associated with said displacement chamber for exhausting said gases therefrom to said desired location, (c) means providing communication between said region of said refrigeration system and said displacement chamber for passing said gases thereto, (d) means for withdrawing liquid from said displacement chamber to create a sufficiently low pressure therein to induce said gases to pass from said region of said refrigeration system to said displacement chamber, (e) means to restrict the return of said gases from said displacement chamber to said region of said refrigeration system, and (f) means to pass a liquid to said displacement chamber under a pressure sufficient to expel the gases therein through said exhaust passage means.

14. A method of removing gases from a region of a refrigeration system and transferring them to a desired location which consists in the steps of:

(a) transferring said gases from said region of said refrigeration system by draining a displacement chamber of a liquid contained therein in order to create a pressure sufficient to induce the flow of said gases from said region of said refrigeration system into said displacement chamber, (b) restricting the return of said gases from said displacement chamber back to said region of said refrigeration system, and (c) introducing a liquid into said displacement chamber under a pressure sufficient to expel said gases therefrom through an exhaust passage to said desired location.

References Cited in the file of this patent
UNITED STATES PATENTS

| | | |
|---|---|---|
| 2,180,441 | Tibbetts | Nov. 21, 1939 |
| 2,367,708 | Anderson | Jan. 23, 1945 |
| 2,610,482 | Berry | Sept. 16, 1952 |
| 2,986,894 | Endress et al. | June 6, 1961 |
| 3,013,404 | Endress et al. | Dec. 19, 1961 |